No. 693,491. Patented Feb. 18, 1902.
H. BROCKELT.
ALTERNATING CURRENT MOTOR METER.
(Application filed Aug. 17, 1900.)

(No Model.)

Witnesses:
Paul F. Munchoff
Paul Steyer.

Inventor:
Hermann Brockelt
by E. Witte
Attorney.

UNITED STATES PATENT OFFICE.

HERMANN BROCKELT, OF BERLIN, GERMANY, ASSIGNOR TO MAX LEVIN, OF BERLIN, PRUSSIA, GERMANY.

ALTERNATING-CURRENT-MOTOR METER.

SPECIFICATION forming part of Letters Patent No. 693,491, dated February 18, 1902.

Application filed August 17, 1900. Serial No. 27,146. (No model.)

*To all whom it may concern:*

Be it known that I, HERMANN BROCKELT, a subject of the German Emperor, residing in Berlin, in the Kingdom of Prussia, Germany, have invented certain new and useful Improvements in Alternating-Current-Motor Meters, of which the following is a specification.

Alternating-current-motor meters which have the object to measure the used electric work in a circuit during a certain time or to indicate it by the number of rotations made in this time by a rotating element which is exposed to the influence of alternating-current fields displaced in their phases toward each other which are excited by the energy to be measured have all the defect that the displacement angle of the tension, which alone guarantees the correct measuring results, which must be, after the well-known principles of Ferraris and Blathy, exactly ninety degrees or a quarter of a wave length, in accordance with the current, cannot be produced without the help of special arrangements, as it is practically impossible to overcome all the losses of energy in this circuit which brings forth the conditional phase displacement. To produce this phase displacement in my meter, built according to Blathy's system, (see Swiss Patent No. 1,534, Class 138, Titus Blathy,) I employ a winding with hardly any induction connected in parallel with the exciting-winding of the tension-field and arranged also upon the electromagnet excited by the main current.

By the arrangement of a winding with hardly any induction upon the electromagnet excited by the main current my alternating-current-motor meter distinguishes itself in so far as novel and advantageous to older well-known arrangements of the same or similar determination that at constructive simplicity—for instance, in comparison to the arrangement described in the German Patent No. 84,676—not two meters are used which are composed of one main and one shunt field, so that at the smallest watt consumption great traction-power of the motor is gained. On the other side is the difference between the proposal of Schallenberger (see German Patent No. 92,860, Reginal Belfield) just as great, who for the same purpose produces a third field or makes such a one out of the already-existing and conditional shunt-field, so that the tension-fields fall together which are displaced among each other.

Figure 1:
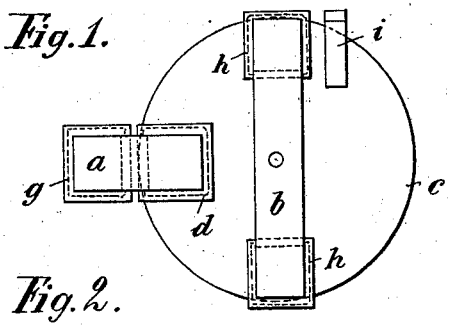
Figure 2:
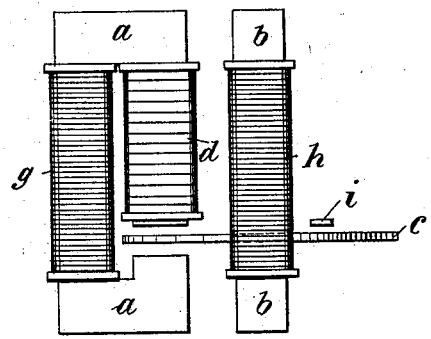
Figure 3:
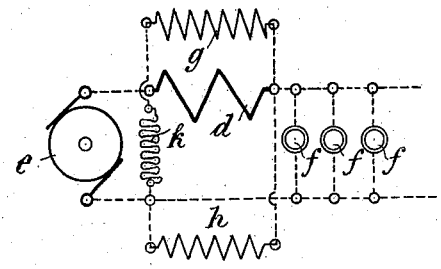
Figure 4:
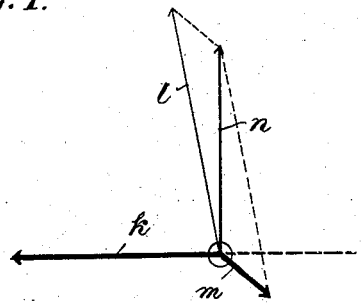

In the accompanying drawings, Figures 1 and 2 show a simple form of the motor-meter with two magnetic fields, Fig. 1 being a top view, and Fig. 2 a side view, of it. Figs. 3 and 4 are diagrams, which will be explained in the following.

The rotator, which is exposed to the influence of two magnetic fields $a$ and $b$, which are displaced to each other in their phases, has the form of a disk $c$, which may be made of any metal, as aluminium, iron, copper, &c. When the primary winding $d$ of the electromagnet $a$, which consists only of a few windings, is connected to the main current, Fig. 3, where $e$ signifies an alternating-current source, and $f$ current-consumers, and when the secondary winding $g$, which consists of many windings, but has hardly any induction, is placed in parallel to the winding $h$ of the electromagnet $b$, the winding of which has a high self-induction, and when for both windings $g$ and $h$ the exciting-current is taken from between two points of the circuit between which the electric energy is to be measured, so the disk $c$ begins to rotate.

The direction of the rotation is determined by the way the windings $d$ and $h$ are connected with the circuit. If, for instance, both are connected so that the direction of the lines of force would be the same in both without phase displacement, the disk turns from the electromagnet $a$ to the electromagnet $b$. If they are connected in the opposite way, the rotation will be opposite also. As both windings $g$ and $h$ of the electromagnets $a$ and $b$, which are put in between two points of the circuit, are themselves displaced in their phases toward each other, because the exciting-winding $g$ of the electromagnet $a$ has a small self-induction or is nearly without induction, the disk will turn, nevertheless, even when the winding $d$ of the electromagnet $a$ is not excited, which corresponds with no current consumption in the outer circuit. Such an unintentional rotation can be overcome by putting a magnetic or diamagnetic metal $i$, which must be formed correspondingly and arranged so that it can be changed into the territory of the lines of force of the electromagnets $a$ and $b$, at the periphery of the disk, so that it is possible by a transposition to give a determined direction to a part of the lines of force, so that they either take no part at all at the rotation of the disk or in a destroying sense.

The number of rotations made during a certain time can be read from a meter suitably arranged, which is added to the construction of the meter already repeatedly described. (See, for instance, the German Patent No. 92,959, George Hummel.) The effect is, besides the definition given by Ferraris of the rotation of a suitably-arranged rotating body working under the influence of phase-displaced alternating-current fields, the following:

When only the winding $h$, which has a high self-induction, of the electromagnet $b$ is excited, the magnetic field of which is displaced less than ninety degrees toward the working tension, a strong rotatory momentum begins in a determined direction, which is given by the manner the windings $d$ and $h$ of the electromagnets $a$ and $b$ are connected in the circuit, as soon as the outer circuit is charged with consumers which are free from self-induction—for instance, with incandescent lamps—because then the main current is in phase with the working tension, and therefore the phase displacement in the motor-meter between the main current and the tension is nearly ninety degrees. If the outer circuit, however, is loaded with a consumer—for instance, a motor which produces the same displacement of the main current to the working tension as has the working tension to the main current in the meter itself—no rotatory momentum will take place, because the working tension has no more displacement to the main current. If the secondary winding $g$, which is nearly without induction, of the electromagnet $a$ is now connected, a second force comes into play with the main current that unites with the working tension and is nearly in phase with the same, so that the meter begins to move again. In this manner the influence is eliminated to the measuring result by the self-induction or capacity in the outer circuit. Fig. 4 shows graphically this independence. If line $k$ represents in its length the electromotoric force in a given moment upon a given circuit and if the position of its angle corresponds to the phase of the current which excites the winding $d$ of the electromagnet $a$ under the supposition that the main current is free from induction and capacity, and, further, if line $l$ corresponds to the power and phase angle of the current flowing through the exciting-winding $h$ of the electromagnet $b$, which lags to the electromotoric force less than ninety degrees, at which the rotatory momentum has reached its maximum, it is evident that we are now able to have a magnetic field signified by line $m$, under such conditions with regard to the power and the phase of its exciting-current work together with the magnet-field corresponding to $l$, so that out of both a new magnet-field is created, signified by line $n$, when to the secondary winding $g$ of the electromagnet $a$ a suitable coefficient of self-induction is given, which can be displaced exactly ninety degrees to the magnet-field which corresponds to the line $k$. The secondary winding $g$ can be rendered non-inductive in well-known manner, a bifilar-wound high ohmic resistance $k$ being inserted before it.

The polarity gained by the secondary winding $g$ with the electromagnet $a$ is to be so arranged that the disk $c$ turns in the same sense as if only the winding $h$ of the electromagnet $b$ were connected and as if the load of the outer circuit were free from induction and capacity.

The outer form of the electromagnets $a$ and $b$, as well as their arrangement with each other, may be carried out in various ways without diminishing the nature of this meter and are left to the judgment of the constructor. For instance, the upper or the lower part of the electromagnet $a$, which works inductively and dynamically upon the rotator $c$, may with especial advantage be constructed in form of a fork, analogous to the arrangement specified by the German Patent No. 92,488 in Figs. 2 and 3. In any case the electromagnets $a$ and $b$ must never cross and in none of their parts run together; but the lines of force of the electromagnets $a$ and $b$ must run through the different parts of the rotator entirely independent from each other. The two magnetic alternating-current fields $a$ and $b$ can also be formed without an iron core in the windings, or either only the winding $h$ or the winding $g$ may be provided with an iron core.

Having fully described my invention and set forth its merits, what I claim, and desire to secure by Letters Patent, is—

An alternating-current-motor meter, comprising two alternating-current fields independent and displaced in their phases relatively to one another, the one field having two separate windings acting in aggregation, consisting of a thick primary winding of only a few turns inserted in the main circuit, and a secondary winding of many turns but almost non-inductive inserted together with the winding of the other alternating field, which possesses high self-induction, between the two points of the circuit between which the energy to be measured is consumed, substantially as described.

In testimony whereof I have hereunto signed my name in the presence of two subscribing witnesses.

HERMANN BROCKELT.

Witnesses:
OTTO HEMRICHS,
M. MARTING.